United States Patent Office 2,718,514
Patented Sept. 20, 1955

---

2,718,514
PROCESS FOR PREPARING SALTS OF SULFONATED POLYSTYRENE

Joel Fantl, Springfield, Mass., assignor to Monsanto Chemical Company, St. Louis, Mo., a corporation of Delaware No Drawing. Application July 29, 1954,
Serial No. 446,663

9 Claims. (Cl. 260—79.3)

This invention relates to water-soluble ammonium and alkali metal salts of sulfonated polystyrene. More particularly, this invention relates to a process for the preparation of the water-soluble ammonium and alkali metal salts of sulfonated polystyrene in finely-divided substantially water-free form.

Water-soluble sulfonated polystyrene can be prepared with comparative ease by reacting polystyrene with a sulfur trioxide complex under substantially anhydrous conditions in a chlorinated solvent. The product is a polystyrene sulfonic acid, sometimes referred to as sulfonated polystyrene, containing an average of about 0.5–2 sulfonic acid groups per styrene unit. For most commercial applications, it is preferable to use this material in the form of a finely-divided substantially water-free ammonium or alkali metal salt thereof. However, difficulties are encountered in preparing alkali metal and ammonium salts of polystyrene sulfonic acid in this physical condition. Most bases such as sodium hydroxide, etc. will not dissolve in the chlorinated solvents that are used in sulfonating polystyrene and, as a result, a separate salt-forming step is usually required.

The polystyrene sulfonic acid may be neutralized in aqueous solution and tray-dried to remove the water, in which case a massive product is obtained which must be broken up prior to use. It is not practical to use an agitated type of drying such as drum or spray drying with the aqueous solution of the neutralized material since the sulfonated polystyrene salts pass through a sticky gel stage as the last of the water is being removed. As a result, the individual particles of polymeric material that are initially formed by the agitated drying process will almost invariably form into rubbery agglomerates which are completely dried only with difficulty and which do not yield the finely-divided product that is desired.

Accordingly, an object of the present invention is the provision of a process for preparing substantially water-free ammonium and alkali metal salts of sulfonated polystyrene in finely-divided particulate form.

Another object is the provision of a process for neutralizing polystyrene sulfonic acid whereby ammonium and alkali metal salts of sulfonated polystyrene are obtained in substantially water-free finely-divided form.

These and other objects are attained by adding polystyrene sulfonic acid with agitation to a solution of an ammonium or alkali metal hydroxide in a mixture of 80–99 parts by weight of a $C_1$ to $C_3$ aliphatic monohydroxy alcohol with 20–1 parts by weight of water at a temperature of not more than about 5° C.

The following examples are given in illustration and are not intended as limitations on the scope of this invention. Where parts are mentioned, they are parts by weight.

PREPARATION OF POLYSTYRENE SULFONIC ACID

Example I

Dissolve 430 parts of bis-(beta-chlorethyl) ether in about 2000 parts of propylene dichloride, cool the solution to about −2° C., while maintaining the solution at this temperature add 120 parts of liquid sulfur trioxide thereto with agitation. In this fashion there is prepared a solution of a coordination complex of sulfur trioxide and the ether in propylene dichloride. Cool this solution to about −20° C. and add thereto with agitation a 10% solution of 100 parts of solid polystyrene in propylene dichloride. The product is a slurry of finely-divided polystyrene sulfonic acid (i. e., sulfonated polystyrene) in a propylene dichloride solution of the ether and residual sulfur trioxide-ether complex. The polystyrene sulfonic acid contains an average of about 1.0 sulfonic acid groups per styrene unit. Filter the slurry on a rotary filter in order to obtain a loose filter cake comprising about 40% polystyrene sulfonic acid, about 50% solvent and about 10% ether and sulfur trioxide-ether complex.

PREPARATION OF SALTS OF SULFONATED POLYSTYRENE

Example II

Prepare a solution of about 10 parts of sodium hydroxide in a mixture of about 10 parts of water and about 150 parts of methanol. Cool the solution to a temperature of about 0° C. and slowly add thereto, with agitation and external cooling, about 100 parts of the filter cake of Example I. The polystyrene sulfonic acid in the filter cake remains suspended in the methanol-water solution and is neutralized to form the sodium salt thereof. Since the neutralization reaction is exothermic, the filter cake should be added to the methanol-water solution at a rate such that the temperature does not exceed more than about 5° C. Agitation should be continued for about an hour after the last of the filter cake has been added. At the end of this time filter the slurry of the sodium salt on a rotary filter and wash the residue with methanol. Dry the washed filtered residue, comprising about 50% sodium salt and about 50% methanol, in a drum dryer. Initiate drying at a temperature of about 65° C. and gradually increase the temperature to about 95° C. over a period of about 4 hours. Apply a vacuum of about 10 inches of mercury during the last hour of drying. The dried product is the water-soluble sodium salt of sulfonated polystyrene in particulate form. Less than about 1% of water and other contaminants are present in the product. The individual particles of the polymer do not gel and agglomerate during the neutralization, filtration and drying steps.

When 60 parts rather than 10 parts of water are used and it is otherwise attempted to repeat Example I, unsatisfactory results are obtained. Rubbery agglomerates of the polystyrene sulfonic acid are formed during addition of the filter cake of Example I to the methanol-water solution. Complete neutralization is not obtained and, moreover, the product cannot be filtered on a rotary filter due to plugging caused by the rubber agglomerates.

If the filter cake of Example I is added to the methanol-water mixture in the absence of sodium hydroxide, the unneutralized polymer is swollen and gelled with the alcohol.

Example III

Prepare a solution of about 15 parts of potassium hydroxide in a mixture of about 15 parts of water and about 250 parts of isopropyl alcohol. Cool the solution to a temperature of about 0° C. and, while maintaining the solution at this temperature, slowly add thereto with agitation and external cooling about 100 parts of the filter cake of Example I. The polystyrene sulfonic acid in the filter cake remains suspended in the isopropyl alcohol-water solution and is neutralized to form the potassium salt thereof. Continue agitation and temperature control for about one hour after addition of the last of the filter cake. At the end of this time, filter the thus-formed slurry of the potassium salt of sulfonated polystyrene in a rotary filter and wash the residue with isopropyl alcohol. Dry the washed filtered residue, comprising about 50% potassium salt and about 50% alcohol, in a drum dryer. Initiate drying at a temperature of about 85° C. and gradually raise the temperature to about 110° C. over a four-hour period. Apply a vacuum of about 10 inches of mercury during the last hour of drying. The dried product is the potassium salt of sulfonated polystyrene in particulate form. Less than about 1% of water and other contaminants are present in the product. The individual particles of the polymer do not gel and agglomerate during the neutralization, filtration and drying steps.

From the foregoing, it is seen that the ammonium and alkali metal salts of sulfonated polystyrene can easily be prepared in substantially water-free granular form by adding polystyrene sulfonic acid to a solution of a suitable ammonium or alkali metal hydroxide in a mixture of about 80–99 parts of an aliphatic monohydroxy alcohol and about 20–1 parts of water. The hydroxide should be dissolved in the alcohol-water mixture prior to addition of the polystyrene sulfonic acid if satisfactory results are to be obtained.

The aliphatic monohydroxy alcohols to be used in accordance with the present invention are the $C_1$ to $C_3$ alcohols including methanol, ethanol, propanol, isopropanol, and mixtures thereof. The hydroxide to be dissolved in the water-alcohol mixture may be ammonium hydroxide, an alkali metal hydroxide such as sodium, potassium, lithium, rubidium and cesium hydroxide or a mixture of two or more such hydroxides. The amount of hydroxide to be used should be slightly in excess of the amount required for complete neutralization of the polystyrene sulfonic acid. Preferably about equal parts by weight of hydroxide and water are used.

If desired, the polystyrene sulfonic acid may be reduced to substantially complete dryness before addition to the neutralizing hydroxide-water-alcohol solution. However, the polystyrene sulfonic acid tends to cross-link and become water-insoluble unless this is done under carefully controlled conditions and, accordingly, it is preferable to add the polystyrene sulfonic acid to the neutralizing solution in the form of a loose filter cake containing appreciable amounts of the sulfonation solvent and sulfonation by-products. The filter cake preferably comprises about 30–60% polystyrene sulfonic acid. In order to obtain the most satisfactory results, it is preferable that about 300 to 1000 parts of the neutralizing solution be used for each 100 parts of filter cake.

The polystyrene sulfonic acid should be added to the neutralizing solution with agitation at a temperature of not more than about 5° C. If the temperature is permitted to rise above 5° C. for any substantial period of time during the neutralization step, cross-linking of the polymer is likely to occur. It is preferable to maintain the temperature within the range of about 0 to 5° C. Since the neutralization is exothermic, it is preferable that external cooling and slow addition of the polystyrene sulfonic acid be used in order to permit accurate temperature control. It is preferable, although not absolutely necessary, to agitate the solution for about 0.5 to 2 hours after addition of the last of the polystyrene sulfonic acid in order to insure complete neutralization and salt formation.

If the polystyrene sulfonic acid is added to the neutralizing solution in the form of a loose filter cake, as in the specific examples, the sulfonation solvent in the filter cake will largely go into solution in the alcohol-water mixture during the neutralization step. In this situation, the slurry of neutralized sulfonated polystyrene should preferably be filtered and washed with an additional quantity of alcohol prior to final drying. If this is done, a purer product having less color and odor is obtained. The washed filtered residue will normally contain about 40 to 60% polymer salt and about 60 to 40% solvent.

Final drying of the ammonium and alkali metal salts of sulfonated polystyrene is preferably conducted at a temperature of less than about 130° C. The temperature to be used should be at least equal to the boiling temperature of the solvent or solvent mixture present in the undried material. It is frequently desirable to slowly raise the temperature to about 90–120° C., in order to insure substantially complete removal of the solvent. It is preferable to apply a vacuum during the final stages of the drying to assist in solvent removal. It is frequently desirable to provide for solvent recovery during the drying step since the solvent can be re-used in the neutralization and filtration of subsequent quantities of polystyrene sulfonic acid.

The polystyrene sulfonic acids that form the starting materials for the present invention may be prepared by known processes such as those described in Baer Patents Nos. 2,533,210 and 2,533,211 and in Signer Patent No. 2,604,456. The polystyrene sulfonic acids prepared by such processes will normally contain an average of about 0.5–2 sulfonic acid groups per styrene unit. Substantially all of the sulfonic acid groups will be converted to salt groups when neutralization is conducted in accordance with the present invention.

The finely-divided substantially water-free ammonium and alkali metal salts of sulfonated polystyrene that are formed by the process of the present invention may be used for a wide variety of purposes. Thus, they may be used as viscosity builders for water-base adhesives, as mold release agents, oil well drilling mud additives, paper sizes, protective colloids, etc. It is to be emphasized that both the polystyrene sulfonic acid that forms the starting material for the present invention and the ammonium and alkali metal salts of sulfonated polystyrene that are prepared therefrom are soluble in water. Thus, a 10% aqueous solution of the sodium salt of sulfonated polystyrene of Example II will have a viscosity of about 300 c. p. s., will have a pH of about 8.5 and will be substantially odorless and colorless.

What is claimed is:

1. A process for preparing a finely-divided substantially water-free water-soluble salt of sulfonated polystyrene which comprises adding polystyrene sulfonic acid to a mixture of about 80–99 parts by weight of a $C_1$ to $C_3$ aliphatic monohydroxy alcohol with about 20–1 parts by weight of water with agitation at a temperature of not more than about 5° C., said alcohol-water mixture having dissolved therein an amount of a hydroxide sufficient to neutralize the polystyrene sulfonic acid, said hydroxide being taken from the group consisting of ammonium and alkali metal hydroxides.

2. A process as in claim 1 wherein the hydroxide is ammonium hydroxide.

3. A process as in claim 1 wherein the hydroxide is an alkali metal hydroxide.

4. A process as in claim 3 wherein the alkali metal hydroxide is sodium hydroxide.

5. A process as in claim 3 wherein the alkali metal hydroxide is potassium hydroxide.

6. A process for preparing a finely-divided substantially water-free, water-soluble salt of sulfonated polystyrene which comprises adding water-soluble polystyrene sulfonic acid to a mixture of about 80–99 parts by weight of methanol with about 20–1 parts by weight of water with agitation at a temperature of about from 0 to 5° C., said water-methanol mixture having dissolved therein an amount of an alkali metal hydroxide sufficient to neutralize the polystyrene sulfonic acid.

7. A process as in claim 6 wherein the amount by weight of water contained in the methanol-water mixture is substantially equal to the amount by weight of alkali metal hydroxide used.

8. A process as in claim 7 wherein the alkali metal hydroxide is sodium hydroxide.

9. A process as in claim 7 wherein the alkali metal hydroxide is potassium hydroxide.

No references cited.